United States Patent
Yen

(10) Patent No.: US 7,322,615 B1
(45) Date of Patent: Jan. 29, 2008

(54) ADJUSTABLE PLUMBING FITTING

(76) Inventor: Chih-Chen Yen, 5F-1, No. 162, Kang-Ting Rd., Taipei (TW)

( * ) Notice: Subject to any disclaimer, the term of this patent is extended or adjusted under 35 U.S.C. 154(b) by 0 days.

(21) Appl. No.: 11/698,327

(22) Filed: Jan. 26, 2007

(30) Foreign Application Priority Data

Jun. 29, 2006 (TW) .............................. 95211413 U

(51) Int. Cl.
*F16L 27/12* (2006.01)
(52) U.S. Cl. ................... 285/32; 285/302; 285/357
(58) Field of Classification Search .............. 285/32, 285/145.1, 302, 357, 392
See application file for complete search history.

(56) References Cited

U.S. PATENT DOCUMENTS

| | | | | | |
|---|---|---|---|---|---|
| 417,393 | A | * | 12/1889 | McAllister | .................... 285/40 |
| 503,432 | A | * | 8/1893 | McIntyre | .................. 285/291.1 |
| 883,080 | A | * | 3/1908 | Bullock | ....................... 285/329 |
| 2,044,302 | A | * | 6/1936 | Holton | ......................... 285/32 |
| 3,201,155 | A | * | 8/1965 | Billeter et al. | .............. 285/350 |
| 3,273,919 | A | * | 9/1966 | Billeter et al. | .............. 285/340 |
| 3,583,003 | A | * | 6/1971 | Thompson | ..................... 4/679 |
| 4,007,878 | A | * | 2/1977 | Anderson | .................... 239/209 |
| 4,932,686 | A | * | 6/1990 | Anderson, Jr. | ................ 285/24 |
| 5,011,193 | A | * | 4/1991 | Porte | ............................ 285/31 |
| 5,542,718 | A | * | 8/1996 | Gronwick et al. | ........... 285/357 |
| 6,050,609 | A | * | 4/2000 | Boscaljon et al. | ............. 285/81 |
| 6,354,637 | B1 | * | 3/2002 | Coronado | .................... 285/357 |
| 2006/0197342 | A1 | * | 9/2006 | Yen | .............................. 285/298 |

* cited by examiner

*Primary Examiner*—James M. Hewitt
(74) *Attorney, Agent, or Firm*—Townsend and Townsend and Crew, LLP

(57) ABSTRACT

An adjustable plumbing fitting is adapted to adjust a length of connection between supply and inlet pipes, and includes a sleeve member, a collar member, and a sealing member. The sleeve member includes an annular section sleeved on and threadedly engaged with the inlet pipe, and a protrusion extending radially from an outer surface of the annular section and abutting against the supply pipe. The collar member includes a tube section sleeved on and threadedly engaged with the supply pipe, and a shoulder formed radially from an inner surface of the tube section and abutting against the protrusion to thereby interpose the protrusion between the shoulder and the supply pipe. The sealing member establishes a watertight seal between the inlet and supply pipes. The sleeve member is selectively displaced on the inlet pipe to vary a depth of insertion of the inlet pipe in the supply pipe.

4 Claims, 6 Drawing Sheets

ADJUSTABLE PLUMBING FITTING

CROSS-REFERENCE TO RELATED APPLICATION

This application claims priority of Taiwanese Application No. 095211413, filed on Jun. 29, 2006, the disclosure of which is incorporated herein by reference.

BACKGROUND OF THE INVENTION

1. Field of the Invention

The present invention relates to an adjustable plumbing fitting, more particularly to an adjustable plumbing fitting that may be used to adjust a length of connection between a supply pipe and an inlet pipe.

2. Description of the Related Art

Referring to FIG. 1, an area in a building, home, etc. where a lavatory apparatus 8 is to be installed is provided with a wall pipe 9 that extends out of a wall, and an outflow hole (not shown) formed in a floor of the building, home, etc. and over which the lavatory apparatus 8 is disposed. A control valve 6 guides the outflow of water from the wall pipe 9, and a flush valve 7 guides the flow of water from the control valve 6 into the lavatory apparatus 8.

However, due to differences in relative positioning between the wall pipe 9 and the outflow hole, and/or variations in the dimensions of the lavatory apparatus 8 (e.g., differences resulting from dissimilar brands), it may become difficult or impossible to interconnect the control valve 6 and the flush valve 7. In such a case, it is necessary to use an adjustable plumbing fitting.

Referring to FIG. 2, U.S. Pat. No. 3,273,919 discloses an adjustable plumbing fitting for use between a supply pipe 11 of a control valve and an inlet pipe 12 of a flush valve, in which an end portion of the supply pipe 11 is sleeved over an end portion of the inlet pipe 12. An O-ring 13 is received in a flanged recess 122 formed in the end portion of the inlet pipe 12. A C-shaped metal gripping ring 14, which has a rhombic cross section, is sleeved on the inlet pipe 12 behind the O-ring 13, and abuts against an end face of the supply pipe 11. The gripping ring 14 is slidably disposed on the inlet pipe 12 and is displaced along with the end face of the supply pipe 11 relative to the inlet pipe 12 as the inlet pipe 12 is inserted deeper into the supply pipe 11. Further, a coupling nut 15 having a shoulder 151 is threadedly engaged with an outer surface of the supply pipe 11. When tightened, the coupling nut 15 moves in a direction away from the flush valve, such that the gripping ring 14 is pressed between the shoulder 151 of the coupling nut 15 and the end face of the supply pipe 11. The interaction between these elements is such that the supply pipe 11 is interlocked with the inlet pipe 12.

However, a drawback of this configuration is that the gripping ring 14 is prone to cut into the outer surface of the inlet pipe 12 when the coupling nut 15 is tightened. Further, since only one edge of the gripping ring 14 presses against the inlet pipe 12 of the flush valve, the gripping ring 14 may lose its frictional contact with the inlet pipe 12 if an external shock is received by the plumbing fitting to thereby loosen the connection between the inlet pipe 12 and the supply pipe 11. In addition, a tool must be used to ensure that the coupling nut 15 is fully tightened.

Referring to FIG. 3, U.S. Pat. No. 5,542,718 discloses an adjustable plumbing conduit. A first conical surface 211 is formed at a mating end of a supply pipe 21 of a control valve, and a second conical surface 221 is formed at a mating end of an inlet pipe 22 of a flush valve. When the first conical surface 211 abuts against the second conical surface 221, and a coupling nut 23 is threadedly engaged with an outer surface of the supply pipe 21, an inwardly directed shoulder 231 of the coupling nut 23 abuts against an outwardly extending projection 222 of the inlet pipe 22. By tightening the coupling nut 23, the inlet pipe 22 and the supply pipe 21 are interconnected.

Although the plumbing conduit achieves its intended purpose of interconnecting the supply pipe 21 of the control valve and the inlet pipe 22 of the flush valve, when these elements are repeatedly subjected to a water hammer effect, leakage of water between the first and second conical surfaces 211,221 and, ultimately, between the coupling nut 23 and the supply pipe 21 of the control valve may occur. Furthermore, an adjusting structure (not shown) of this conventional plumbing conduit is complicated and involves many parts.

SUMMARY OF THE INVENTION

Therefore, the object of this invention is to provide an adjustable plumbing fitting that is able to adjust a length of connection between a supply pipe and an inlet pipe utilizing a simple structure, that does not require the use of tools for assembly and to ensure fully secure coupling, that provides a tight seal, and that does not cause damage to the supply pipe or the inlet pipe during assembly.

The adjustable plumbing fitting is adapted to adjust a length of connection between a supply pipe and an inlet pipe, in which an end portion of the inlet pipe is inserted in an end portion of the supply pipe. The adjustable plumbing fitting of this invention comprises a sleeve member, a collar member, and a sealing member.

The sleeve member includes an annular section that is adapted to be sleeved on and threadedly engaged with the inlet pipe, and that has an outer surface. The sleeve member further includes a protrusion extending radially from the outer surface of the annular section at an end of the annular section adjacent to the supply pipe. The protrusion has a first side adapted to abut against an end face of the supply pipe, and a second side opposite to the first side.

The collar member includes a tube section that is adapted to be sleeved on and threadedly engaged with the end portion of the supply pipe, and that has an inner surface. The collar member further includes a shoulder formed radially from the inner surface of the tube section. The shoulder abuts against the second side of the protrusion of the sleeve member to thereby interpose the protrusion between the shoulder and the end face of the supply pipe.

The sealing member is adapted to be disposed on an outer surface of the end portion of the inlet pipe so as to establish a watertight seal between the inlet pipe and the supply pipe.

The annular section of the sleeve member is adapted to be selectively displaced on the inlet pipe so that a depth of insertion of the end portion of the inlet pipe in the end portion of the supply pipe may be varied.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
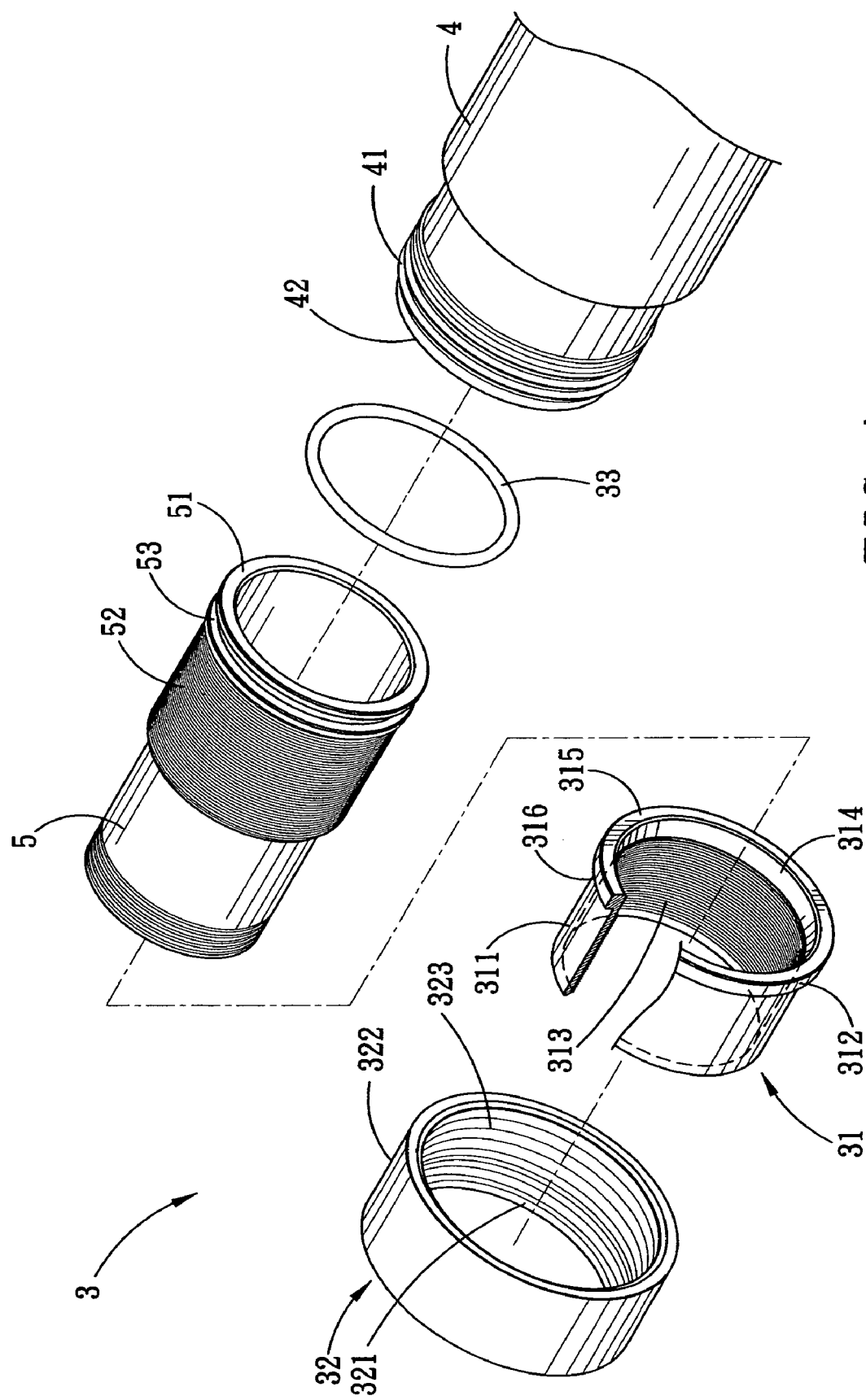
FIG. 4 is a fragmentary exploded perspective view, illustrating an adjustable plumbing fitting according to a preferred embodiment of the present invention, an inlet pipe of a flush valve, and a supply pipe of a control valve.
Figure 5:
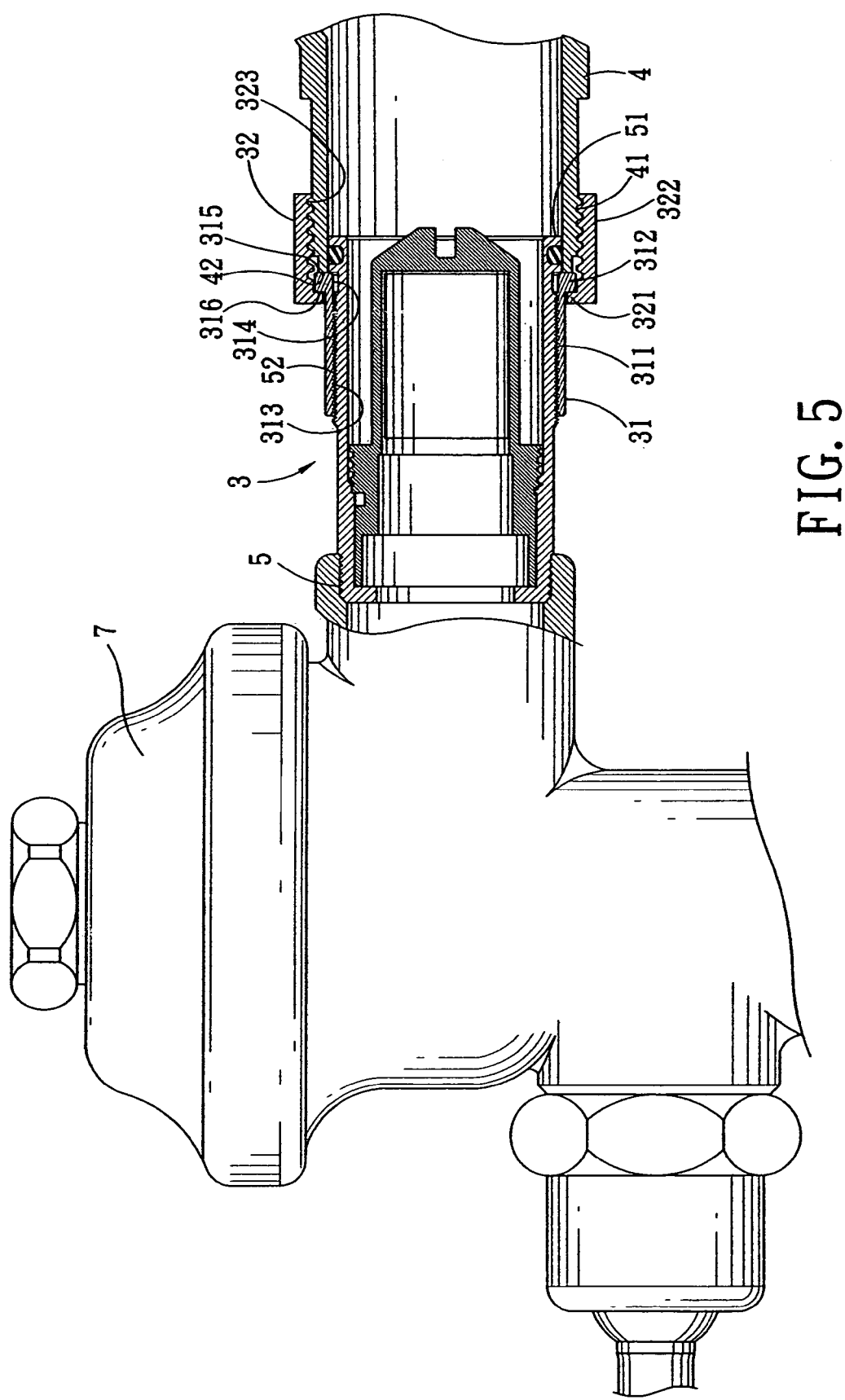
FIG. 5 is fragmentary partly sectional schematic view of the adjustable plumbing fitting of FIG. 4 in a fully assembled state.

Referring to FIGS. 4 and 5, an adjustable plumbing fitting 3 according to a preferred embodiment of the present invention is adapted to be applied to a lavatory system. The lavatory system includes a control valve (not shown) that has a supply pipe 4 and that guides water out from a wall pipe (not shown), and a flush valve 7 that has an inlet pipe 5 and that receives water from the control valve and guides the water into a lavatory apparatus (not shown) in response to activation of a flush mechanism of the flush valve 7. An end portion of the inlet pipe 5 is inserted in an end portion of the supply pipe 4.

The adjustable plumbing fitting 3 of the present invention is adapted to adjust a length of connection between the supply pipe 4 and the inlet pipe 5, and includes a sleeve member 31, a collar member 32, and a sealing member 33.

The sleeve member 31 includes an annular section 311 adapted to be sleeved on and threadedly engaged with the inlet pipe 5. In more detail, the annular section 311 has an outer surface and an inner surface, and a first inner thread 313 is formed on the inner surface of the annular section 311. Further, a first outer thread 52 is formed on an outer surface of the inlet pipe 5. The first inner thread 313 of the sleeve member 31 engages the first outer thread 52 of the inlet pipe 5. In this embodiment, the first inner thread 313 and the first outer thread 52 are left-handed threads.

The sleeve member 31 further includes a protrusion 312 extending radially from the outer surface of the annular section 311 at an end of the annular section 311 adjacent to the supply pipe 4. The protrusion 312 has a first side 315 adapted to abut against an end face 42 of the supply pipe 4, and a second side 316 opposite to the first side 315. In this embodiment, the inner surface of the annular section 311 of the sleeve member 31 has a smooth segment 314 that is opposite to the protrusion 312 of the sleeve member 31.

Figure 6:
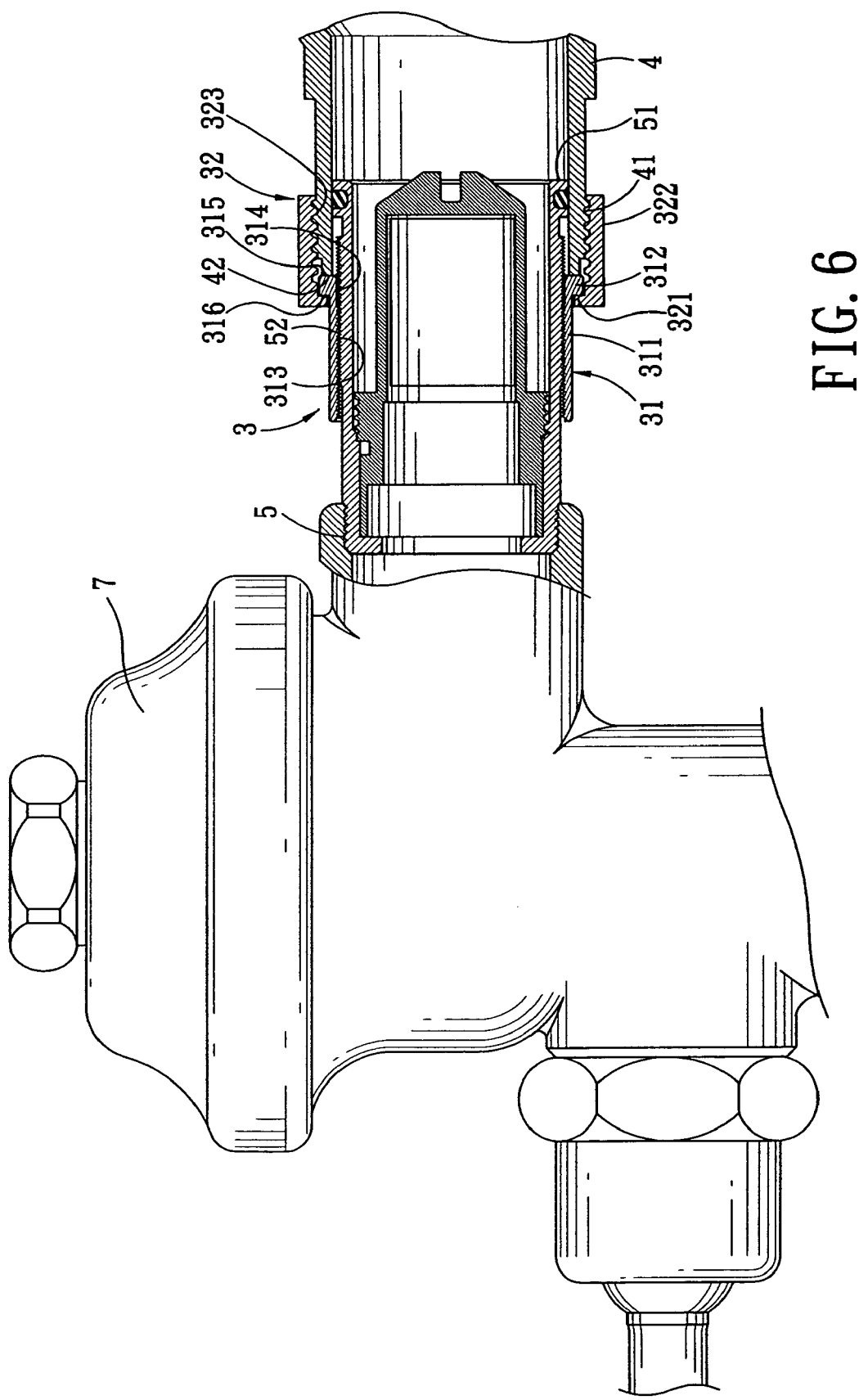
FIG. 6 is a view similar to FIG. 5, but illustrating the adjustable plumbing fitting in a different state of adjustment.

By rotating the annular section 311 of the sleeve member 31, the sleeve member 31 may be displaced on the inlet pipe 5. Hence, a depth of insertion of the end portion of the inlet pipe 5 in the end portion of the supply pipe 4 may be varied. FIGS. 5 and 6 show two different states of adjustment of the sleeve member 31 and corresponding varying depths of insertion of the inlet pipe 5 in the supply pipe 4.

The collar member 32 includes a tube section 322 adapted to be sleeved on and threadedly engaged with the end portion of the supply pipe 4. In more detail, the tube section 322 has an inner surface and an outer surface, and a second inner thread 323 is formed on the inner surface of the tube section 322. Further, a second outer thread 41 is formed on an outer surface of the supply pipe 4. The second inner thread 323 of the collar member 32 engages the second outer thread 41 of the supply pipe 4. In this embodiment, the second inner thread 323 and the second outer thread 41 are right-handed threads.

The collar member 32 further includes a shoulder 321 formed radially from the inner surface of the tube section 322. The shoulder 321 abuts against the second side 316 of the protrusion 312 of the sleeve member 31 to thereby interpose the protrusion 312 between the shoulder 321 and the end face 42 of the supply pipe 4.

The sealing member 33 is adapted to be disposed on the outer surface of the end portion of the inlet pipe 5 so as to establish a watertight seal between the inlet pipe 5 and the supply pipe 4. In this embodiment, the sealing member 33 is disposed between an end face 51 and the first outer thread 52 of the inlet pipe 5. A flanged recess 53 may be formed in the inlet pipe 5 for reception of the sealing member 33. In this embodiment, the sealing member 33 is a seal ring.

During installation of the lavatory apparatus to which the adjustable plumbing fitting 3 of the present invention is applied, the inlet pipe 5 with the sealing member 33 disposed thereon is first inserted into the supply pipe 4. By engaging the sleeve member 31 with the inlet pipe 5 and rotating the former, the depth of insertion of the inlet pipe 5 in the supply pipe 4 may be varied as needed.

Subsequently, the collar member 32 is slid toward the supply pipe 4 and threadedly engaged with the same until the shoulder 321 of the collar member 32 abuts against the protrusion 312 of the sleeve member 31. If the collar member 32 is further tightened on the supply pipe 4, friction between the collar member 32 and the sleeve member 31 eventually reaches a point sufficient to rotate the sleeve member 31 along with the collar member 32. Since the sleeve member 31 and the collar member 32 are threadedly engaged respectively with the inlet pipe 5 and the supply pipe 4 in opposite directions, such co-rotation of the collar member 32 and the sleeve member 31 results in displacement of the same in opposite directions. In this case, further tightening of the collar member 32 results in displacement thereof in the direction toward the supply pipe 4, while the sleeve member 31 is displaced in the opposite direction toward the inlet pipe 5. Hence, the protrusion 312 of the sleeve member 31 is more tightly squeezed between the end face 42 of the supply pipe 4 and the shoulder 321 of the collar member 32 to thereby fully interlock the inlet pipe 5 with the supply pipe 4. This completes the assembly process to result in the configuration as shown in FIG. 5 or FIG. 6.

The preferred embodiment of the present invention has the following advantages:

1. A simple structure allowing for cooperation between the sleeve member 31 and the inlet pipe 5 is used to adjust the length of connection between the supply pipe 4 and the inlet pipe 5.

2. Since the sleeve member 31 and the collar member 32 are threadedly engaged with the inlet pipe 5 and the supply pipe 4, respectively, in opposite directions, no tools are needed for the connection between the inlet pipe 5 and the supply pipe 4.

Figure 1:
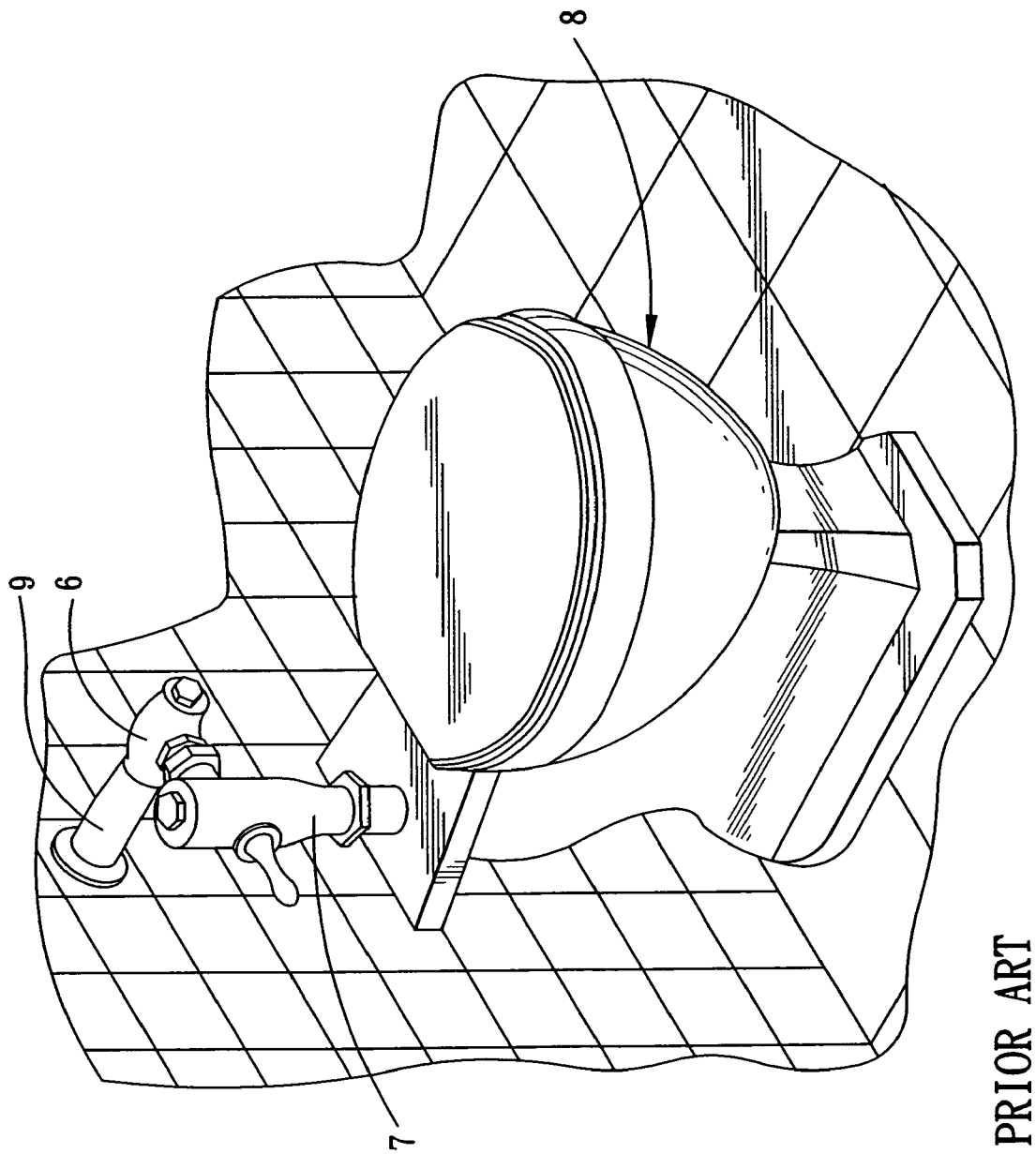
FIG. 1 is a schematic diagram of a common lavatory system.
Figure 2:
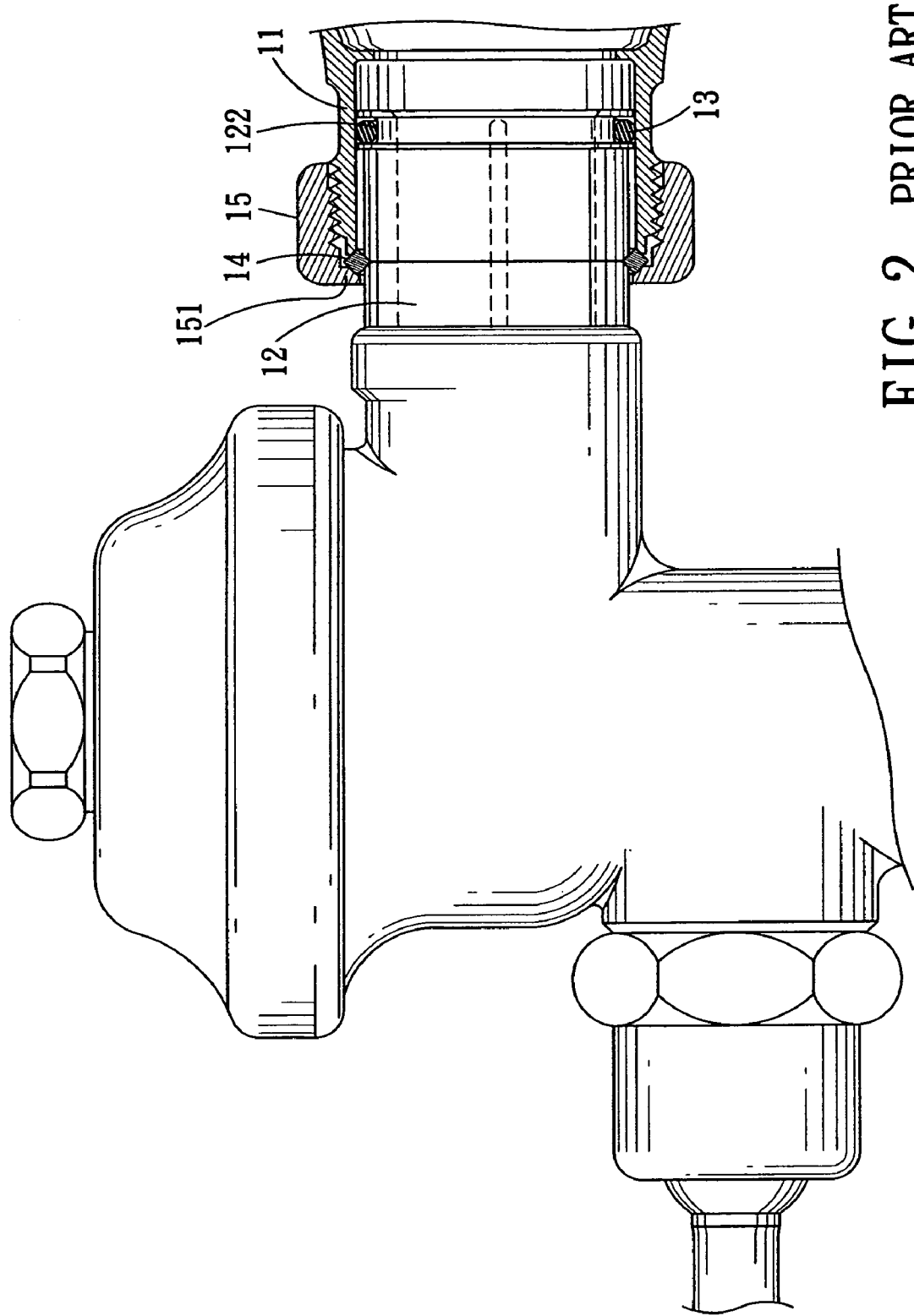
FIG. 2 is a fragmentary partly sectional schematic view, illustrating an adjustable plumbing fitting disclosed in U.S. Pat. No. 3,273,919.
Figure 3:
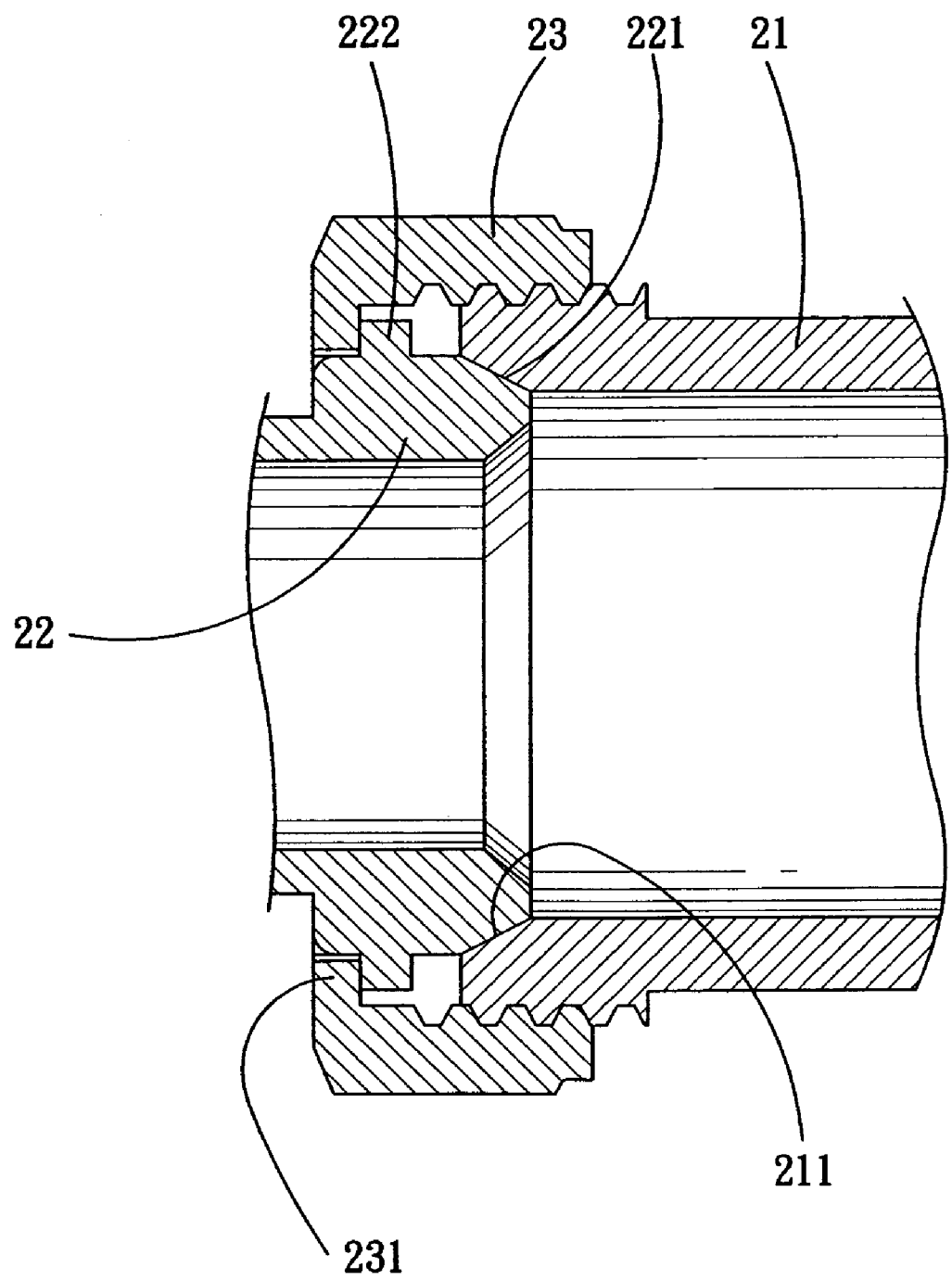
FIG. 3 is a fragmentary sectional view of an adjustable plumbing conduit disclosed in U.S. Pat. No. 5,542,718.

3. Since locking of the elements of the present invention is realized through abutment of flat surfaces, no damage to elements occurs during assembly of the adjustable plumbing fitting 3 of the present invention. This is in contrast to the gripping ring 14 cutting into the inlet pipe 12 of the conventional plumbing fitting shown in FIG. 2.

4. The covering of the first outer thread 52 of the inlet pipe 5 by the sleeve member 31 is such that damage to the first outer thread 52 is prevented, as is injury to persons using the lavatory system through inadvertent contact with the first outer thread 52.

5. A dual locking structure is realized in the present invention through use of two pairs of threaded engagements. As a result, the connection between the inlet pipe 5 and the supply pipe 4 is secure, and any loosening of the adjustable plumbing fitting 3 due to external shocks or forces resulting from a water hammer effect is prevented.

6. Through the tight seal formed among the sealing member 33, the sleeve member 31, and the collar member 32, leakage of water from the adjustable plumbing fitting 3 is prevented.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An adjustable plumbing fitting adapted to adjust a length of connection between a supply pipe and an inlet pipe, an end portion of the inlet pipe being inserted in an end portion of the supply pipe, said adjustable plumbing fitting comprising:

a sleeve member including
 an annular section adapted to be sleeved on and threadedly engaged with the inlet pipe, and having an outer surface, and
 a protrusion extending radially from said outer surface of said annular section at an end of said annular section adjacent to the supply pipe, said protrusion having a first side adapted to abut against an end face of the supply pipe, and a second side opposite to the first side;

a collar member including
 a tube section adapted to be sleeved on and threadedly engaged with the end portion of the supply pipe, and having an inner surface, and
 a shoulder formed radially from said inner surface of said tube section, said shoulder abutting against said second side of said protrusion of said sleeve member to thereby interpose said protrusion between said shoulder and the end face of the supply pipe; and a sealing member adapted to be disposed on an outer surface of the end portion of the inlet pipe so as to establish a watertight seal between the inlet pipe and the supply pipe;

wherein said annular section of said sleeve member is adapted to be selectively displaced on the inlet pipe so that a depth of insertion of the end portion of the inlet pipe in the end portion of the supply pipe may be varied.

2. The adjustable plumbing fitting of claim 1, wherein said annular section of said sleeve member is adapted to be threadedly engaged with the inlet pipe in a first direction, and said tube section of said collar member is adapted to be threadedly engaged with the supply pipe in a second direction opposite to said first direction.

3. The adjustable plumbing fitting of claim 1, wherein an inner surface of said annular section of said sleeve member opposite to said protrusion of said sleeve member is smooth.

4. The adjustable plumbing fitting of claim 1, wherein said sealing member is a seal ring.

* * * * *